(12) United States Patent
Hyatt (10) Patent No.: US 9,011,060 B2
(45) Date of Patent: Apr. 21, 2015

(54) NO FLANGE DAMAGE WEDGE LOCK WASHERS

(75) Inventor: Thomas B. Hyatt, Cromwell, CT (US)

(73) Assignee: United Technologies Corporation, Hartford, CT (US)

( * ) Notice: Subject to any disclaimer, the term of this patent is extended or adjusted under 35 U.S.C. 154(b) by 280 days.

(21) Appl. No.: 13/563,110

(22) Filed: Jul. 31, 2012

(65) Prior Publication Data

US 2014/0037399 A1   Feb. 6, 2014

(51) Int. Cl.
| F16B 39/10 | (2006.01) |
| F16B 39/24 | (2006.01) |
| F16B 43/00 | (2006.01) |
| F16B 39/282 | (2006.01) |

(52) U.S. Cl.
CPC ............ *F16B 43/009* (2013.01); *F16B 39/282* (2013.01)

(58) Field of Classification Search
USPC ............. 411/87, 89, 132, 136, 138, 145, 147, 411/149, 163, 204, 205
IPC .............................................. F16B 39/10,39/24
See application file for complete search history.

(56) References Cited

U.S. PATENT DOCUMENTS

| 382,789 | A | * | 5/1888 | Benton | 411/87 |
| 543,695 | A | * | 7/1895 | Leroux | 411/101 |
| 607,741 | A | * | 7/1898 | Gardner | 411/89 |
| 625,529 | A | * | 5/1899 | Andress | 411/136 |
| 688,273 | A | * | 12/1901 | Ward | 411/138 |
| 884,290 | A | * | 4/1908 | Oca | 411/143 |
| 910,712 | A | * | 1/1909 | McCoy | 411/136 |
| 1,077,763 | A | * | 11/1913 | Stark | 411/254 |
| 1,159,131 | A | * | 11/1915 | Thompson | 411/136 |
| 1,184,930 | A | * | 5/1916 | Coulter | 411/120 |
| 1,708,305 | A | * | 4/1929 | Flowers | 411/197 |
| 1,896,679 | A | * | 2/1933 | Olson | 411/116 |
| 3,646,982 | A | | 3/1972 | Cushman | |
| 4,895,484 | A | | 1/1990 | Wilcox | |
| 5,080,545 | A | | 1/1992 | McKainlay | |
| 2004/0131443 | A1 | | 7/2004 | Terry | |

OTHER PUBLICATIONS

International Search Report and Written Opinion for related International Application No. PCT/US2013/036279; report dated Apr. 12, 2013.

* cited by examiner

*Primary Examiner* — Gary Estremsky
(74) *Attorney, Agent, or Firm* — Miller, Matthias & Hull LLP (57) ABSTRACT

No flange damage wedge lock washers are disclosed. The washers may comprise an upper washer and a lower washer. The lower washer may have a generally smooth bottom surface and at least one means for securement. The at least one means for securement may be arranged to keep together the lower washer and a flange without causing damage to the flange. A locking fastener assembly which comprises no flange damage wedge lock washers is also disclosed. The locking fastener assembly may include a lower washer having a generally smooth bottom surface and at least one means for securement. A method of manufacturing a locking fastener assembly which comprises no flange damage wedge lock washers is also disclosed. The locking fastener assembly of the method may include a lower washer having a generally smooth bottom surface and at least one means for securement.

15 Claims, 7 Drawing Sheets

NO FLANGE DAMAGE WEDGE LOCK WASHERS

FIELD OF THE DISCLOSURE

The present disclosure generally relates to a threaded fastener assembly and, more particularly, relates to a wedge locking threaded fastener assembly.

BACKGROUND OF THE DISCLOSURE

Various nuts and bolts are used as fastener assemblies in manufacturing industry, for example, in modern aircraft construction. For instance, when parts of an aircraft need to be joined during operation and to be disassembled or replaced frequently during maintenance, a threaded fastener may be used to allow both riveting and dismantling functions. In addition, when joints require great strength and rigidity, a threaded fastener may be a better choice than a rivet.

In connection with the utilization of nuts and bolts, washers may also be used to provide an enhanced securement for fastener assemblies. In particular, a locking fastener assembly may be employed to prevent loosening of a threaded fastener element during operation. There are multiple scenarios in which a locking fastener assembly is desirable and required to prevent a nut from unfastening. One of such applications is at the joint of workpieces in close proximity to an airfoil along the flowpath in a gas turbine engine due to aerodynamic considerations which favor tertiary locking for fastener assemblies using wedge lock washers. These wedge lock washers are designed to secure fasteners that have a tendency to rotate or lose friction under the impact of vibration or dynamic loads.

A wedge locking threaded fastener assembly is known in the art. For example, such a locking threaded fastener assembly may include two identical and superposing washer pieces, which are supported on one another in a point-symmetric way and which are arranged with cammed faces in mutual engagement. The two washers are located between the head of the threaded bolt and the flange which separates the washers from the surface of the joint. On one hand, the inwardly facing, cammed faces of the washers include a tooth arrangement such as, for example, wedge shaped teeth. Such a tooth arrangement provides form-fit between the two washer pieces when the screw is being tightened. On the other hand, the outwardly facing surfaces of the washers include serrations which increase friction between the washer and the surfaces of the bolt head and the flange. Such serrations dig into the bolt head and the flange surface in depths wherein they will not be disengaged as the bolt elongates. The purpose of this design is to have the serration teeth "bite" into the associated surfaces to prevent slippage between the washer and the flange and between the washer and the bolt. Motion at the outside faces of the washer pieces would require shearing of the flange and/or bolt head material. The combined results have shown that the wedge locking washers have been very effective against loosening of the nut.

One disadvantage of such serration structure is that the surfaces on the flange and bolt have to be relatively soft in order for the serration teeth to exert the desired biting action. As a result, there are mated impressions on the flange surface caused by the teeth bites. Such impressions create stress concentrations whose effects are difficult to quantify or analyze. Since stresses may lead to flange failure and the ensuing loosening of the fastener and previously joined workpieces, it is desirable to minimize or eliminate flange or coating damages caused by the serrations of the washer pieces of a fastener assembly.

To better answer the challenges raised by the gas turbine industry to produce reliable and high-performance gas turbines, it is therefore desirable to find wedge locking washers which would provide the required securement for the a fastener assembly. Further, reusable wedge locking washers without causing flange damage are desirable as well.

SUMMARY OF THE DISCLOSURE

In accordance with one aspect of the present disclosure, a locking fastener assembly to secure a joint is disclosed. The locking fastener assembly may comprise a first upper washer and a first lower washer constituting a first pair of washers. The first upper washer may have a first serrated side and a first cammed side while the first lower washer may have a second cammed side and a first generally smooth side. The first and second cammed sides may be arranged to face each other. The first generally smooth side of the first lower washer may be arranged to face a flange. There may be at least one first means for securement on the first lower washer. The at least one first means for securement may be arranged to keep together the first lower washer and the flange while a surface of the flange may have a receiving member to receive and engage the at least one first means for securement when the surface of the flange facing the first lower washer.

In a refinement, the locking fastener assembly may further comprise a fastener nut.

In another refinement, the locking fastener assembly may further comprise a fastener bolt.

In another refinement, the at least one first means for securement of the locking fastener assembly may comprise at least one member selected from the group consisting of a first anti-rotation protrusion on a first outer side of the first lower washer, a second anti-rotation protrusion on the first generally smooth side of the first lower washer, a first generally flat surface on a second outer side of the first lower washer, and an anti-rotation adhesive patch on the first generally smooth side.

In another refinement, the locking fastener assembly may further comprise a connector connecting the first lower washer with a second lower washer. The second lower washer may have a third cammed side and a second generally smooth side. The second generally smooth side of the second lower washer may be arranged to face the flange. There may be at least one second means for securement on the second lower washer. The at least one second means for securement may be arranged to keep together the second lower washer and the flange while the surface of the flange may be arranged to receive and engage the at least one second means for securement.

In another refinement, the locking fastener assembly may further comprise a second upper washer which constitutes a second pair of washers with the second lower washer. The second upper washer may have a second serrated side and a fourth cammed side. The third and fourth cammed sides may be arranged to face each other.

In another refinement, the locking fastener assembly may further comprise a third lower washer and a protection plate. The third lower washer may have a fifth cammed side and a third generally smooth side. The third generally smooth side of the third lower washer may be arranged to face the flange. There may be at least one third means for securement on the third lower washer. The at least one third means for securement may be arranged to keep together the third lower washer and the flange. The surface of the flange may be arranged to receive and engage the at least one third means for securement. The protection plate may be arranged against the surface of the flange. The protection plate may comprise at least first and second bolt apertures and at least first and second anti-rotation apertures. While the first anti-rotation aperture may be arranged to allow the first means for securement to pass through, the second anti-rotation aperture may be arranged to allow the third means for securement to pass through. The first and third lower washers may be on a one side of the protection plate while the surface of the flange may be on the opposite sides of the protection plate.

In a refinement, the locking fastener assembly may further comprise a third upper washer which constitutes a third pair of washers with the third lower washer. The third upper washer may have a third serrated side and a sixth cammed side with the fifth and sixth cammed sides being arranged to face each other.

In a refinement, the locking fastener assembly may further comprise at least one mistake-proof protrusion on the first upper washer. When the first upper washer is against the surface of the flange, the at least one mistake-proof protrusion may prevent the receiving member from receiving and engaging the first upper washer.

In still another refinement, the locking fastener assembly may further comprise a bolt which may have a bolt head. When the first cammed side faces the bolt head and the first serrated side faces the second cammed side, the at least one mistake-proof protrusion may prevent the bolt from securing the joint.

In accordance with another aspect of the present disclosure, a wedge lock washer assembly is disclosed. The wedge lock washer assembly may comprise a first upper washer and a first lower washer constituting a first pair of washers. The first upper washer may have a first serrated side and a first cammed side while the first lower washer may have a second cammed side and a first generally smooth side. The first and second cammed sides may be arranged to face each other. The first generally smooth side of the first lower washer may be arranged to face a flange. There may be at least one first means for securement on the first lower washer. The at least one first means for securement may be arranged to keep together the first lower washer and the flange while a surface of the flange may have a receiving member to receive and engage the at least one first means for securement when the surface of the flange facing the first lower washer.

In a refinement, the at least one first means for securement of the wedge lock washer assembly may comprise at least one member selected from the group consisting of a first anti-rotation protrusion on a first outer side of the first lower washer, a second anti-rotation protrusion on the first generally smooth side of the first lower washer, a first generally flat surface on a second outer side of the first lower washer, and an anti-rotation adhesive patch on the first generally smooth side.

In another refinement, the wedge lock washer assembly may further comprise a connector connecting the first lower washer with a second lower washer. The second lower washer may have a third cammed side and a second generally smooth side. The second generally smooth side of the second lower washer may be arranged to face the flange. There may be at least one second means for securement on the second lower washer. The at least one second means for securement may be arranged to keep together the second lower washer and the flange while the surface of the flange may be arranged to receive and engage the at least one second means for securement.

In another refinement, the wedge lock washer assembly may further comprise a second upper washer which constitutes a second pair of washers with the second lower washer. The second upper washer may have a second serrated side and a fourth cammed side. The third and fourth cammed sides may be arranged to face each other.

In another refinement, the wedge lock washer assembly may further comprise a third lower washer and a protection plate. The third lower washer may have a fifth cammed side and a third generally smooth side. The third generally smooth side of the third lower washer may be arranged to face the flange. There may be at least one third means for securement on the third lower washer. The at least one third means for securement may be arranged to keep together the third lower washer and the flange. The surface of the flange may be arranged to receive and engage the at least one third means for securement. The protection plate may be arranged against the surface of the flange. The protection plate may comprise at least first and second bolt apertures and at least first and second anti-rotation apertures. While the first anti-rotation aperture may be arranged to allow the first means for securement to pass through, the second anti-rotation aperture may be arranged to allow the third means for securement to pass through. The first and third lower washers may be on a one side of the protection plate while the surface of the flange may be on the opposite sides of the protection plate.

In a refinement, the wedge lock washer assembly may further comprise a third upper washer which constitutes a third pair of washers with the third lower washer. The third upper washer may have a third serrated side and a sixth cammed side with the fifth and sixth cammed sides being arranged to face each other.

In still another refinement, the wedge lock washer assembly may further comprise at least one mistake-proof protrusion on the first upper washer. When the first upper washer is against the surface of the flange, the at least one mistake-proof protrusion may prevent the receiving member from receiving and engaging the first upper washer.

In accordance with another aspect of the present disclosure, a method of manufacturing a locking fastener assembly to secure a joint is disclosed. The method may comprise the steps of: (a) providing a first upper washer and a first lower washer constituting a first pair of washers. The first upper washer may have a first serrated side and a first cammed side while the first lower washer may have a second cammed side and a first generally smooth side; (b) arranging the first and second cammed sides to face each other; (c) arranging the first generally smooth side of the first lower washer to face a flange; (d) providing at least one first means for securement on the first lower washer; (e) arranging the at least one first means for securement to keep together the first lower washer and the flange; and (f) providing a receiving member on a surface of the flange to receive and engage the at least one first means for securement. The surface of the flange may face the first generally smooth side of the first lower washer.

In a refinement, the method may further comprise the steps of: (g) providing a fastener bolt; and (h) providing a fastener nut.

In still another refinement, the at least one first means for securement in the method may comprise at least one member selected from the group consisting of a first anti-rotation protrusion on a first outer side of the first lower washer, a second anti-rotation protrusion on the first generally smooth side of the first lower washer, a first generally flat surface on a second outer side of the first lower washer, and an anti-rotation adhesive patch on the first generally smooth side.

Further forms, embodiments, features, advantages, benefits, and aspects of the present disclosure will become more readily apparent from the following drawings and descriptions provided herein.

Before proceeding with the detailed description, it is to be appreciated that the following detailed description is merely exemplary in nature and is not intended to limit the invention or the application and uses thereof. In this regard, it is to be additionally appreciated that the described embodiment is not limited to use in conjunction with a particular type of joints or gas turbine. Hence, although the present disclosure is, for convenience of explanation, depicted and described as shown in certain illustrative embodiments, it will be appreciated that it can be implemented in various other types of embodiments and equivalents, and in various other systems and environments.

DETAILED DESCRIPTION OF THE DISCLOSURE

As used herein, "relatively smooth" is defined as a surface relatively free from irregularities, roughness, or projections whose depth or height is greater than about one-fourth their average diameter or 1 mm as measured from the surface. A person with ordinary skill in the art will understand and recognize that a generally smooth surface does not have serrations or cams or other structures which may cause friction between sliding surfaces.

The term "generally flat" for purposes of the present disclosure is defined as a surface which is considered flat by a person with ordinary skills in the art or a planar surface within a tolerance level of 1 degree.

Figure 1:
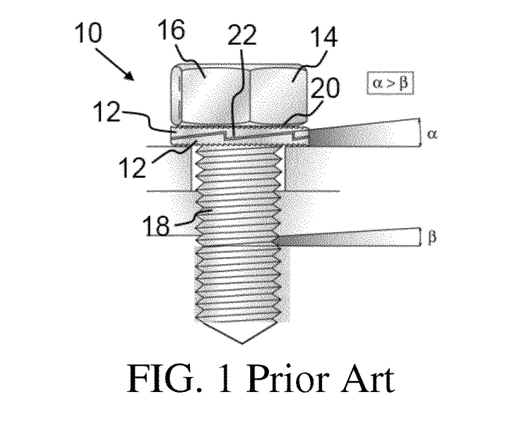
FIG. 1 is an elevation view of a typical prior art fastener assembly having a wedge lock washer assembly.

Referring now to the drawings, and with specific reference to FIG. 1, there is depicted a typical prior art fastener assembly with a wedge lock washer assembly 10. The wedge lock washer assembly 10 is provided as two identical annular washers 12, which are operatively incorporated in a threaded fastener assembly. In addition to the wedge lock washer assembly 10, the threaded fastener assembly further includes a fastener bolt 14 which has a head portion 16 and a threaded shank portion 18, and optionally an internally threaded fastener nut (not shown). Each annular washer 12 comprises a serrated surface 20, which is outwardly facing, and a cammed surface which is inwardly facing. Further, each cammed surface extends at an inclination angle $\alpha$ to the plane defined by the tops of the serrated surface 20. The pitch angle (or lead angle) $\beta$ of the treads on bolt 14 is smaller than the inclination angle $\alpha$.

Figure 2:
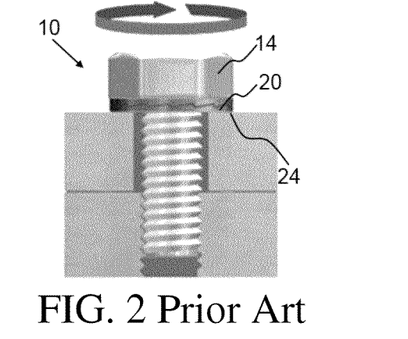
FIG. 2 is an elevation view of a typical prior art fastener assembly in FIG. 1 while being tightened.
Figure 3:
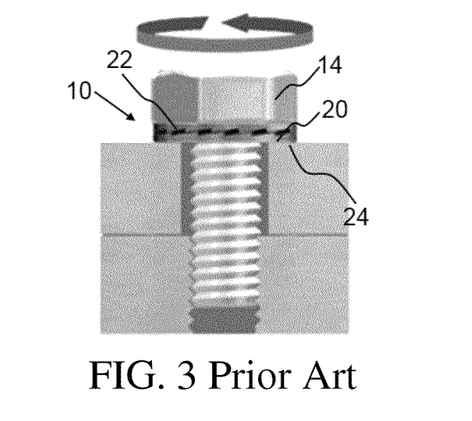
FIG. 3 is an elevation view of a typical prior art fastener assembly in FIG. 1 while being loosened.

FIGS. 2-3 illustrate how a typical prior art wedge lock washer assembly works during operation. When tightened, the bolt 14 and the flange surface 24 slip against the two outwardly facing serrated surfaces 20 of the annular washer 12, respectively. In addition, the two cammed surfaces 22 are engaged each other and rotate together with the bolt 14 until the bottom serrated surface 20 engages and grips the flange surface 24. Continued rotation of the bolt 14 causes a greater axial movement of the wedge lock washers 10 than the axial movement of the bolt 14 because the inclination angle $\alpha$ is bigger than the pitch angle (or lead angle) $\beta$. This axial movement applies a load to the flange surface 24, causes the lower annular washer 12 to compress and dig into the flange surface 24, and thereby prevents movement between the wedge lock washer assembly 10 and the flange surface 24.

Vibration will not tend to loosen the bolt 14 because as the bolt tends to back off the threads, the inter-engagement of the cammed surfaces 22 of the two washers 12 tend to displace the bolt 14 axially a greater distance than the axial movement of the bolt 14 axially due to rotation about the threads of the bolt. Accordingly, as the bolt 14 attempts to be backed off, the frictional engagement between the bolt 14, the washers 12, and the flange surface is increased. This locking mechanism uses tension as well as friction to resist loosening under vibration. In order to loosen the bolt 14 when it is in a tightened condition, considerable amount of the applying torque is required to disengage the two washers 12, allow the cammed surface 22 slip against each other, and stretch the bolt 14 higher than the ramp of the cammed surface 22. Thus, the bolt 14 is securely locked and prevented from inadvertent loosening when tightened in the presence of the wedge lock washers 10.

Figure 4:
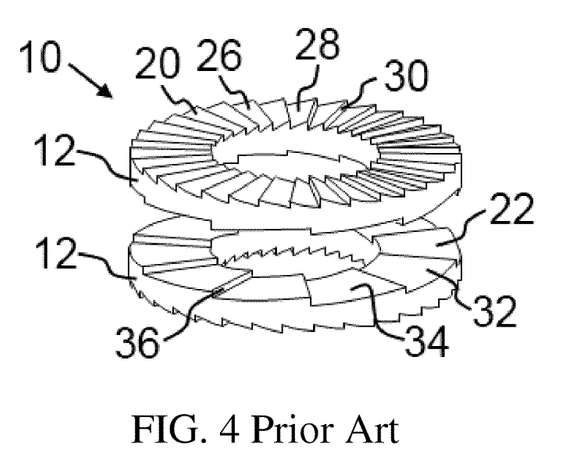
FIG. 4 is an exploded, perspective view of a typical prior art wedge lock washer assembly in FIG. 1.

Turning now to FIG. 4, an exploded view of the typical prior art wedge lock washers 10 shows a more detailed look of the washers. As described before, each annular washer 12 has a serrated surface 20 and a cammed surface 22 with a central aperture, through which the bolt 14 passes. On one hand, the serrated surface 20 includes a plurality of serration elements 26, each of which has a sloping surface 28 and an abutment surface 30. The slope of the sloping surface 28 is in the opposite direction of the tightening rotation of the bolt 14 while the slope of the abutment surface 30 slopes deeply in the same direction of the tightening rotation. On the other hand, the cammed surface 22 comprises a plurality of cam elements 32, each of which has a sloping surface 34 and an abutment surface 30. The slope of the sloping surface 34 is in the same direction of the tightening rotation of the bolt 14 while the slope of the abutment surface 30 slopes deeply in the opposite direction of the tightening rotation.

Figure 5:
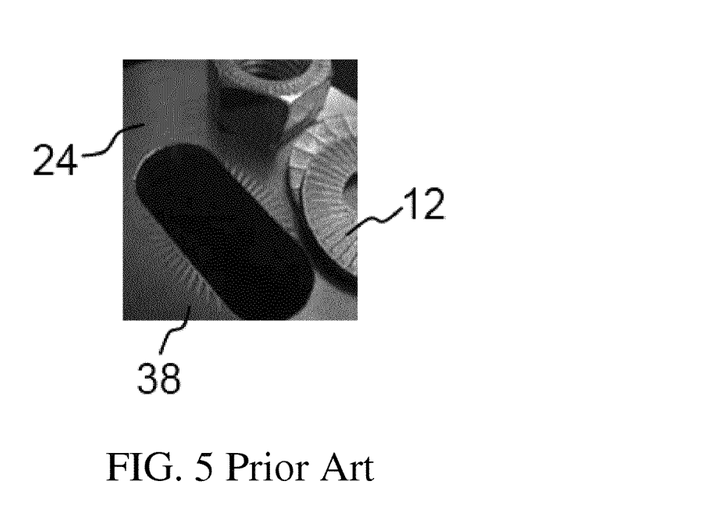
FIG. 5 is an image showing the associated damage (impressions) by a typical prior art wedge lock washer assembly in FIG. 1 on the surface of a flange.

One downside of this highly effective locking system is that the serration elements 26 on the serrated surface 20 bite into the flange surface 24 as shown in FIG. 5. The bites leave flange impressions 38 on the flange surface 24. In turn, the flange impressions 38 create stress concentrations in the flange, whose effect is difficult to quantify and analyze. Consequently, this stress is a potential threat to the fatigue life of the fastener assembly and may lead to unexpected product failure during operation.

Figure 6:
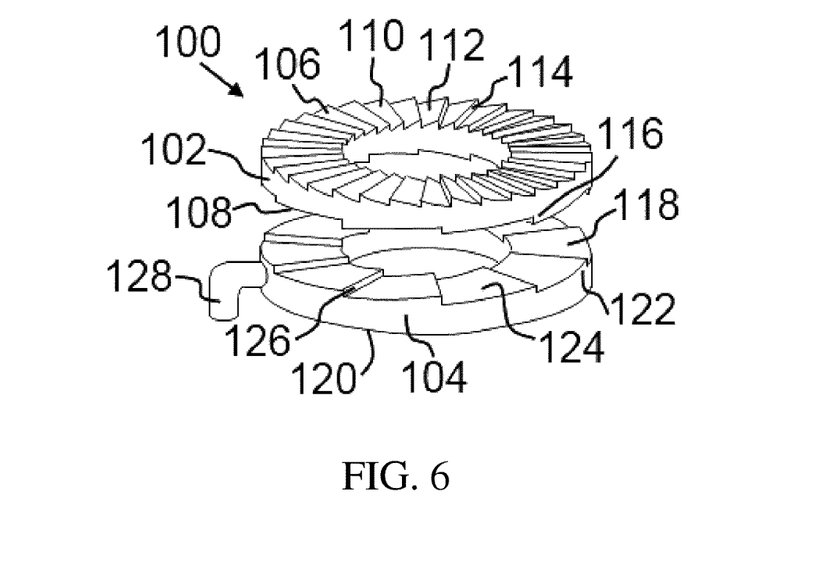
FIG. 6 is an exploded, perspective view of a no flange damage wedge lock washer assembly according to the present disclosure.

Because of the above problem of the current wedge lock washers, there is a need for an improved design of wedge lock washers that do not cause flange or coating damages and serve to improve the fatigue life of a fastener assembly. To accomplish this goal, the no flange damage wedge lock washers 100 as depicted in FIG. 6 is disclosed. As shown therein, the no flange damage wedge lock washers 100 may include an upper washer 102 and a lower washer 104, each of which has a central aperture. Both washers 102 and 104 may be forged steel elements and made from, for example, medium carbon steel, titanium and its alloys, or any other suitable materials.

The upper washer 102 may have a serrated surface 106 and a cammed surface 108. On one hand, the serrated surface 106 may include a plurality of uniformly spaced and radially extending serration elements 110, each of which may have a sloping surface 112 and an abutment surface 114. The sloping surface 112 may incline in the opposite direction in reference to the tightening rotation of a corresponding bolt (not shown) and with a predetermined angle while the abutment surface 114 may incline in the same direction of the tightening rotation with a steep slope. On the other hand, the cammed surface 108 may comprise a plurality of cam elements 116, each of which may display a geometry matching the counterpart in the lower washer 104.

As to the lower washer 104, it may include a cammed surface 118 and a generally smooth bottom face 120. The cammed surface 118 may face and contact the matching cammed surface 108, and share the same surface geometry therewith. For example, the cammed surface 118 may comprise a plurality of cammed elements 122, each of which may have a sloping surface 124 and an abutment surface 126. The slope of the sloping surface 124 may incline in the same direction in reference to the tightening rotation of the corresponding bolt and with a predetermined angle while the slope of the abutment surface 126 may incline in the opposite direction of the tightening rotation with a steep slope. Further, the cammed elements 116 and 122 may be identically spaced and inclined to facilitate an effective engagement between the upper washer 102 and the lower washer 104. Finally, an anti-rotation tab 128 may be attached to the outer side of the lower washer 104 as shown in FIG. 6 with a predetermined shape and dimension. There may be a matching hole (not shown) on the flange surface to which the no flange damage wedge lock 100 washers are placed.

Even though FIG. 6 depicts the no flange damage wedge lock washers 100 as having certain relative dimensions, such dimensions are only exemplary and other relative dimensions are possible. Further, although the anti-rotation tab is shown in FIG. 6 as having a certain shape, other shapes are possible and fit within the scope of the claims.

In use, the lower washer 104 may be first placed over the flange surface at a joint and the anti-rotation tab 128 may be inserted into the matching hole on the flange surface to engage and grip the flange. Then the upper washer 102 may be placed on top of the lower washer 104 with the cammed surface 108 in contact with the cammed surface 118. After a bolt is inserted through the apertures of the no flange damage wedge lock washers, a matching nut may be threaded on the bolt.

As the nut is rotated and tightened, a bolt surface may contact and engage the serrated surface 106. Continued rotation of the nut may cause a greater axial movement of the wedge lock washers 100 than axial movement of the nut because the cammed surfaces 108 and 118 have a greater inclination than the pitch angle of the threads on the bolt. The serration elements 110 may compress and dig into the adjacent face of the bolt and thereby prevent movement between the bolt and the upper washer 102. Further, the tightening action may also lock the two washers 102 and 104 together due the interactions between the two cammed surfaces 108 and 118. Moreover, as described above, the lower washer 104 may be locked with the flange via engagement of the anti-rotation tab 128 and the match hole, and thereby may resist rotation of the lower washer 104 relative to the flange. In this manner, the nut and bolt is securely locked at the joints and prevented from inadvertent loosening. In addition, there is little damage caused by the generally smooth bottom surface 120 on the flange.

Furthermore, vibration may not tend to loosen the fastener because as the bolt back off the threads of the nut, the inter-engagement of its face with the adjacent serrated surface 106 tend to displace the wedge lock washer axially a greater distance than the axial movement of the bolt/nut due to the bigger inclination of the sloping surfaces 112 and 124 than the pitch angle of the thread. Thus, as the bolt attempts to back off, the frictional engagement between the bolt and the wedge lock washers is actually increased.

Figure 7:
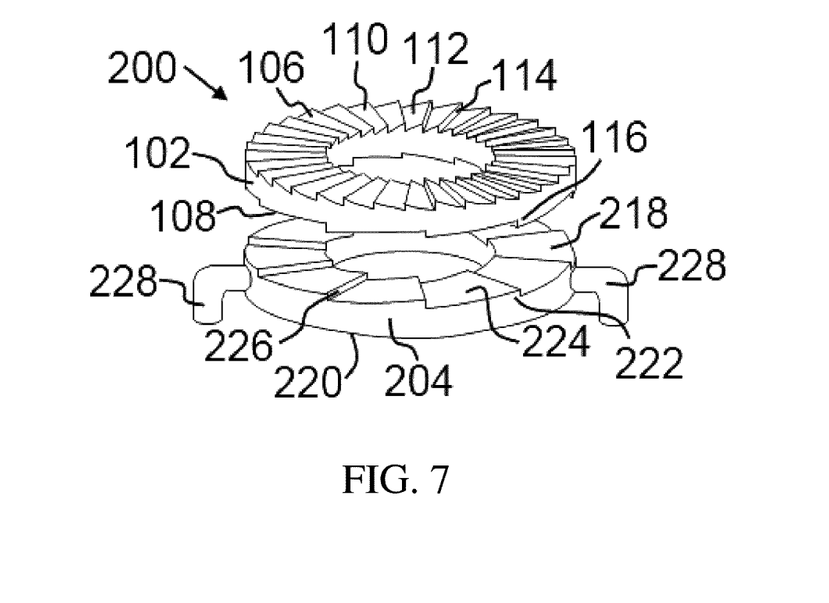
FIG. 7 is an exploded, perspective view of another no flange damage wedge lock washer assembly according to the present disclosure.

Turning now to FIG. 7, no flange damage wedge lock washers 200 are shown to have an upper washer 102 with all its components as described in FIG. 6. In addition, the no flange damage wedge lock washers 200 may include a lower washer 204, which may include a cammed surface 218 and a generally smooth bottom face 220. The cammed surface 218 may face and contact the matching cammed surface 108, and share the same surface geometry therewith. For example, the cammed surface 218 may comprise a plurality of cammed elements 222, each of which may have a sloping surface 224 and an abutment surface 226. The slope of the sloping surface 224 may incline in the same direction in reference to the tightening rotation of the corresponding bolt and with a predetermined angle while the slope of the abutment surface 226 may incline in the opposite direction of the tightening rotation with a steep slope. Further, the cammed elements 116 and 222 may be identically spaced and inclined to facilitate an effective engagement between the upper washer 102 and the lower washer 204. Finally, two anti-rotation tabs 228 may be attached to the outer side of the lower washer 204 as shown in FIG. 7 with a predetermined shape and dimension. Those two tabs 228 may be located symmetrically in reference to the center of the lower washer 204.

Such a configuration may resist higher torques experience by the wedge lock washers during installation or removal since they provide a more balanced resistance when compared with the wedge lock washers 100. There may be two matching holes (not shown) on the flange surface which the tabs 228 can engage respectively. Similar to the wedge lock washers 100, washers 200 can secure the nut and bolt at the joint without much damage to the flange contacting the lower washer 204.

Even though FIG. 7 depicts no flange damage wedge lock washers 200 as having certain relative dimensions, such dimensions are only exemplary and other relative dimensions are possible. Further, although the anti-rotation tab is shown in FIG. 7 as having a certain shape, other shapes are possible. Moreover, even though there are two anti-rotation tabs in FIG. 7, other numbers of anti-rotation tabs are possible.

Figure 8:
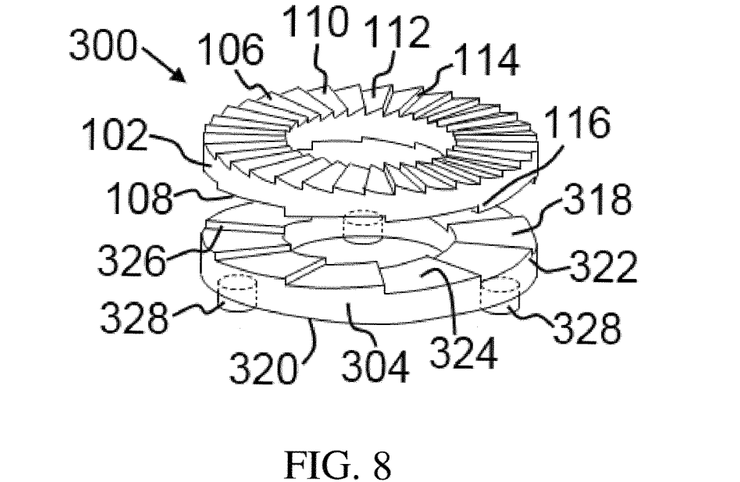
FIG. 8 is an exploded, perspective view of another no flange damage wedge lock washer assembly according to the present disclosure.

Alternatively, other types of anti-rotation component are possible with the no flange damage wedge lock washers according to the present disclosure. FIG. 8 depicts a no flange damage wedge lock washers 300 which include an upper washer 102 with the same components as what are described in FIG. 6. In addition, the no flange damage wedge lock washers 300 may include a lower washer 304, which may include a cammed surface 318 and a generally smooth bottom face 320. The cammed surface 318 may face and contact the matching cammed surface 108, and share the same surface geometry therewith. Specifically, the cammed surface 318 may comprise a plurality of cammed elements 322, each of which may have a sloping surface 324 and an abutment surface 326. The slope of the sloping surface 324 may incline in the same direction in reference to the tightening rotation of the corresponding bolt and with a predetermined angle while the slope of the abutment surface 326 may incline in the opposite direction of the tightening rotation with a steep slope. Further, the cammed elements 116 and 322 may be identically spaced and inclined to facilitate an effective engagement between the upper washer 102 and the lower washer 304. Finally, three anti-rotation pegs 328 may be attached to the generally smooth bottom face 320 of the lower washer 304 as shown in FIG. 7 with a predetermined shape and dimension. Those three pegs 328 may be located as an equilateral triangle whose center is coaxial with the center of the lower washer 304.

Such a configuration may resist higher torques experience by the wedge lock washers during installation or removal since they provide a more balanced resistance when compared with the wedge lock washers 100. Further, if challenged for space to accommodate the tab(s) (as in FIGS. 6-7), or if the installation and removal torques experienced by the anti-rotation tab(s) are high, these cylindrical pegs would be a better choice to resist the high torques when allowed by the shear capability of the materials making the wedge lock washers 300. There may be three matching holes (not shown) on the flange surface which the pegs 328 can engage respectively. Similar to the wedge lock washers 100, washers 300 can secure the nut and bolt at the joint without much damage to the flange contacting the lower washer 204.

Even though FIG. 8 depicts no flange damage wedge lock washers as having certain relative dimensions, such dimensions are only exemplary and other relative dimensions are possible. Further, although the anti-rotation tab is shown in FIG. 8 as having a certain shape, other shapes are possible. Moreover, even though there are three anti-rotation pegs in FIG. 8, other numbers of anti-rotation pegs are possible. Finally, it should be noted that the generally smooth bottom face 320 is considered generally smooth if the surface thereof not covered by the anti-rotation tabs 328 is generally smooth.

Sometimes an existing geometry within the proximity of the locking joint may be used to accomplish an anti-rotation action for the no flange damage wedge lock washers according to the present disclosure. For instance, if a locking joint is adjacent to an upstanding flange or gusset, the flange or gusset may provide a vertical, flat surface for the wedge lock washers to lean on.

Figure 9:
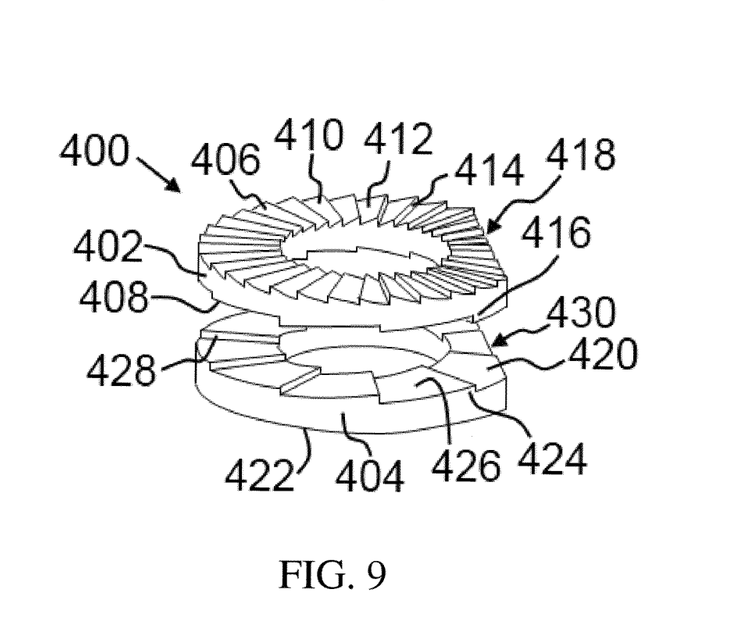
FIG. 9 is an exploded, perspective view of another no flange damage wedge lock washer assembly according to the present disclosure.

Referring now to FIG. 9, no flange damage wedge lock washers 400 are shown as having a D-shape. As shown therein, the no flange damage wedge lock washers 400 may include an upper washer 402 and a lower washer 404, each of which has a central aperture. The upper washer 402 may have a serrated surface 406 and a cammed surface 408. On one hand, the serrated surface 406 may include a plurality of uniformly spaced and radially extending serration elements 410, each of which may have a sloping surface 412 and an abutment surface 414. The sloping surface 412 may incline in the opposite direction in reference to the tightening rotation of a corresponding bolt (not shown) and with a predetermined angle while the abutment surface 414 may incline in the same direction of the tightening rotation with a steep slope. On the other hand, the cammed surface 408 may comprise a plurality of cam elements 416, each of which may display a geometry matching the counterpart in the lower washer 404. Moreover, the upper washer 402 may have a generally flat side surface 418 which intersects both the serrated surface 406 and the cammed surface 408.

As to the lower washer 404, it may include a cammed surface 420 and a generally smooth bottom face 422. The cammed surface 420 may face and contact the matching cammed surface 408, and share the same surface geometry therewith. For example, the cammed surface 420 may comprise a plurality of cammed elements 424, each of which may have a sloping surface 426 and an abutment surface 428. The slope of the sloping surface 426 may incline in the same direction in reference to the tightening rotation of the corresponding bolt and with a predetermined angle while the slope of the abutment surface 428 may incline in the opposite direction of the tightening rotation with a steep slope. In addition, the cammed elements 416 and 424 may be identically spaced and inclined to facilitate an effective engagement between the upper washer 402 and the lower washer 404. Furthermore, the lower washer 404 may have a generally flat side surface 430 which intersects both the cammed surface 420 and the generally smooth bottom surface 422, and is parallel with the side surface 418.

Even though FIG. 9 depicts the no flange damage wedge lock washers 400 as having certain relative dimensions, such dimensions are only exemplary and other relative dimensions are possible. Further, although the wedge lock washers 400 are shown in FIG. 9 as having a D-shape when viewed from the top, other shapes are possible. In addition, even though both washers 402 and 404 are shown to have the same shape in FIG. 9, they may have different shapes. For example, washer 402 may keep the donut shape of upper washer 102 if the height of the adjacent, existing geometry at the joint is shorter than the thickness of the lower washer 404.

In operation, the no flange damage wedge lock washers 400 is used in a similar way as the washers 100, except that the blockage of the rotation of the wedge lock washers relative to the flange is realized through the engagement between the side surface 430/418 and the adjacent, vertical, flat surface of the existing geometry. In this case, the shape of the lower washer 404 and the upper washer 402 may be tailored to meet the dimensional requirement and constraints of the existing geometry.

Figure 10:
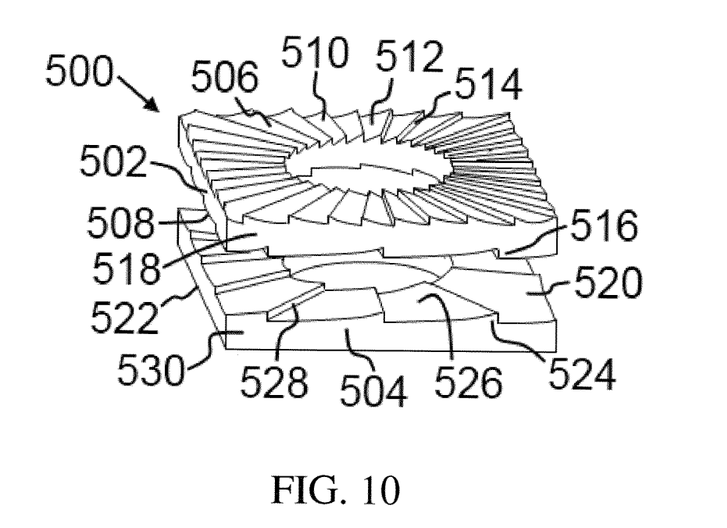
FIG. 10 is an exploded, perspective view of another no flange damage wedge lock washer assembly according to the present disclosure.

A further application of this strategy to enable the locking function is shown in FIG. 10. There are depicted no flange damage wedge lock washers 500 having a square shape, when there are multiple restrictive geometries at the locking joint and these geometries may form a square shape or at least a right angle adjacent to the locking joint. The no flange damage wedge lock washers 500 may include an upper washer 502 and a lower washer 504, each of which has a central aperture. The upper washer 502 may have a serrated surface 506 and a cammed surface 508. On one hand, the serrated surface 506 may include a plurality of uniformly spaced and radially extending serration elements 510, each of which may have a sloping surface 512 and an abutment surface 514. The sloping surface 512 may incline in the opposite direction in reference to the tightening rotation of a corresponding bolt (not shown) and with a predetermined angle while the abutment surface 514 may incline in the same direction of the tightening rotation with a steep slope. On the other hand, the cammed surface 508 may comprise a plurality of cam elements 516, each of which may display a geometry matching the counterpart in the lower washer 404. Moreover, the upper washer 502 may have four generally flat side surfaces 518, which intersect both the serrated surface 506 and the cammed surface 508 and which form a square shape when view from the top.

As to the lower washer 504, it may include a cammed surface 520 and a generally smooth bottom face 522. The cammed surface 520 may face and contact the matching cammed surface 508, and share the same surface geometry therewith. For example, the cammed surface 520 may comprise a plurality of cammed elements 524, each of which may have a sloping surface 526 and an abutment surface 528. The slope of the sloping surface 526 may incline in the same direction in reference to the tightening rotation of the corresponding bolt and with a predetermined angle while the slope of the abutment surface 528 may incline in the opposite direction of the tightening rotation with a steep slope. Further, the cammed elements 516 and 524 may be identically spaced and inclined to facilitate an effective engagement between the upper washer 502 and the lower washer 504. Furthermore, the lower washer 504 may have four generally flat side surfaces 530 which intersect both the cammed surface 520 and the generally smooth bottom surface 522, and are parallel with the corresponding side surfaces 518.

Even though FIG. 10 depicts the no flange damage wedge lock washers 500 as having certain relative dimensions, such dimensions are only exemplary and other relative dimensions are possible. Further, although the wedge lock washers 500 are shown in FIG. 10 as having a square shape when viewed from the top, other shapes are possible. In addition, even though both washers 502 and 504 are shown to have the same shape in FIG. 10, they may have different shapes. For example, washer 502 may keep the donut shape of upper washer 102 if the height of the adjacent, existing geometry at the joint is shorter than the thickness of the lower washer 504.

In operation, the no flange damage wedge lock washers 500 is used in a similar way as the washers 400, except that the blockage of the rotation of the wedge lock washers 500 relative to the flange may be realized through the engagement between multiple side surfaces of the washer 500 and the adjacent, vertical, flat surfaces of the existing geometry or geometries. In this case, the shape of the lower washer 504 and the upper washer 502 may be tailored to meet the dimensional requirement and constraints of the existing geometry or geometries.

Figure 11:
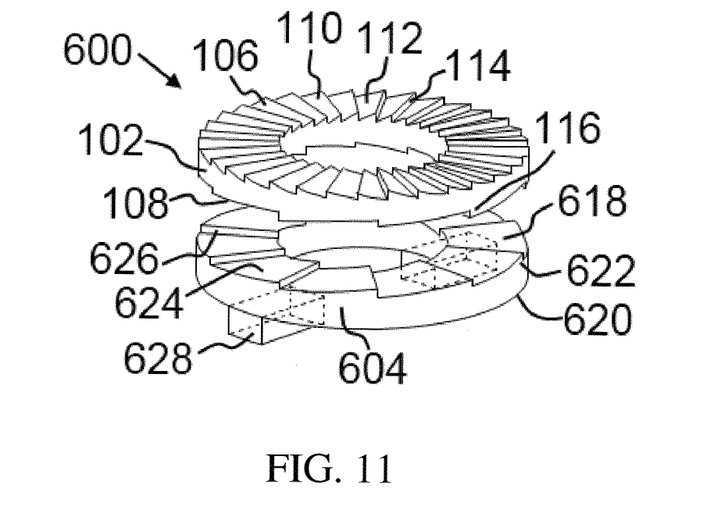
FIG. 11 is an exploded, perspective view of another no flange damage wedge lock washer assembly according to the present disclosure.

Referring now to FIG. 11, no flange damage wedge lock washers 600 are shown to include an upper washer 102 with all its components as described in FIG. 6. In addition, the no flange damage wedge lock washers 500 may have a lower washer 604, which may include a cammed surface 618 and a generally smooth bottom face 620. The cammed surface 618 may face and contact the matching cammed surface 108, and share the same surface geometry therewith. For example, the cammed surface 618 may comprise a plurality of cammed elements 622, each of which may have a sloping surface 624 and an abutment surface 626. The slope of the sloping surface 624 may incline in the same direction in reference to the tightening rotation of the corresponding bolt and with a predetermined angle while the slope of the abutment surface 626 may incline in the opposite direction of the tightening rotation with a steep slope. Further, the cammed elements 116 and 622 may be identically spaced and inclined to facilitate an effective engagement between the upper washer 102 and the lower washer 604. Finally, two anti-rotation ribs 628 may be attached to the generally smooth bottom face 620 of the lower washer 604 as shown in FIG. 11 with a predetermined shape and dimension. Those two ribs 628 may be located symmetrically in reference to the center of the lower washer 604.

Such a configuration may resist higher torques experience by the wedge lock washers during installation or removal since they provide a more balanced resistance when compared with the wedge lock washers 100. There may be two matching grooves (not shown) on the flange surface which the ribs 628 can engage respectively. Similar to the wedge lock washers 100, washers 200 can secure the nut and bolt at the joint without much damage to the flange contacting the lower washer 604. Finally, the shapes and numbers of ribs 628 may partially resemble the tip of any commercially available screwdrivers as long as the matching groove patterns can be machined into the flange surface.

Even though FIG. 11 depicts no flange damage wedge lock washers 600 as having certain relative dimensions, such dimensions are only exemplary and other relative dimensions are possible. Further, although the anti-rotation ribs 628 are shown in FIG. 11 as having a certain shape, other shapes are possible. Moreover, even though there are two anti-rotation ribs 628 in FIG. 11, other numbers of anti-rotation ribs are possible. It should be noted that the generally smooth bottom face 620 is considered generally smooth if the surface thereof not covered by the anti-rotation ribs 628 is generally smooth.

Figure 12:
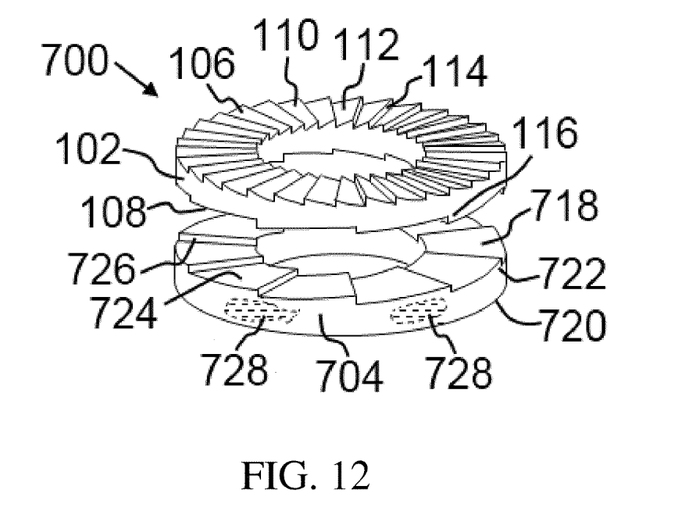
FIG. 12 is an exploded, perspective view of another no flange damage wedge lock washer assembly according to the present disclosure.

Still, there are other methods to restrict the relative rotation between the wedge lock washers and the flange and secure the washers to the flange. One way is to use adhesives as shown in FIG. 12. No flange damage wedge lock washers 700 comprise an upper washer 102 with all its components as described in FIG. 6. In addition, the no flange damage wedge lock washers 600 may include a lower washer 704, which may have a cammed surface 718 and a generally smooth bottom face 720. The cammed surface 718 may face and contact the matching cammed surface 108, and share the same surface geometry therewith. For example, the cammed surface 718 may comprise a plurality of cammed elements 722, each of which may have a sloping surface 724 and an abutment surface 726. The slope of the sloping surface 724 may incline in the same direction in reference to the tightening rotation of the corresponding bolt and with a predetermined angle while the slope of the abutment surface 726 may incline in the opposite direction of the tightening rotation with a steep slope. Further, the cammed elements 116 and 722 may be identically spaced and inclined to facilitate an effective engagement between the upper washer 102 and the lower washer 704. Finally, two anti-rotation adhesives 728 may be applied to the generally smooth bottom face 720 of the lower washer 604 as shown in FIG. 21 with a predetermined location and dimension. Those two adhesives 628 may be located symmetrically or asymmetrically in reference to the center of the lower washer 704. The location may be chosen by the person skilled in the art considering the conditions affecting the joints, including but not limited to: temperature, pressure, vibration frequencies and intensities, stress concentration, expected failure life for the nut and bolt, geometry constraints, etc. The adhesives used may be, for example, epoxy adhesives or other suitable adhesives.

Even though FIG. 12 depicts no flange damage wedge lock washers 700 as having certain relative dimensions, such dimensions are only exemplary and other relative dimensions are possible. Further, although the anti-rotation adhesives 728 are shown in FIG. 12 as having a certain shape, other shapes are possible. Moreover, even though there are two anti-rotation adhesives 728 in FIG. 12, other numbers of anti-rotation adhesives are possible. The anti-rotation adhesives may be applied onto either part of or the entire surface of the bottom face 720. It should be noted that the generally smooth bottom face 720 is considered generally smooth before the application of the adhesives 728.

As shown above, wedge lock washers only function when the cammed faces of the upper and lower washers mate with each other to prevent the relative rotation therebetween. During initial assembly, typical prior wedge lock washers contain pre-glued pairs of washers to ensure correct orientation. However, since each washer piece has two opposite faces containing ridges, after the glued washers pair dissembled, the pair might end up with the wrong orientation when reassembled, leaving the two cammed faces pointing outwardly and the two serrated faces pointing inwardly while engaging each other.

Figure 13:
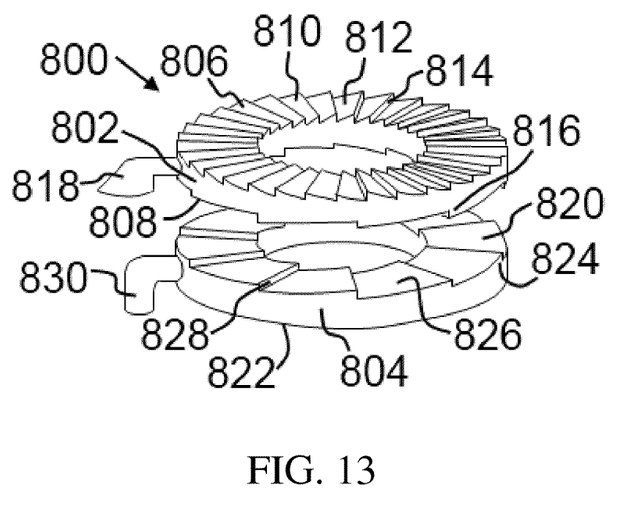
FIG. 13 is an exploded, perspective view of another no flange damage wedge lock washer assembly according to the present disclosure.

To solve this problem, additional features can be introduced to no flange damage wedge lock washers according to the present disclosure. For example, FIG. 13 depicts no flange damage wedge lock washers 800. The no flange damage wedge lock washers 800 may include an upper washer 802 and a lower washer 804, each of which has a central aperture. The upper washer 802 may have a serrated surface 806 and a cammed surface 808. On one hand, the serrated surface 806 may include a plurality of uniformly spaced and radially extending serration elements 810, each of which may have a sloping surface 812 and an abutment surface 814. The sloping surface 812 may incline in the opposite direction in reference to the tightening rotation of a corresponding bolt (not shown) and with a predetermined angle while the abutment surface 814 may incline in the same direction of the tightening rotation with a steep slope. On the other hand, the cammed surface 808 may comprise a plurality of cam elements 816, each of which may display a geometry matching the counterpart in the lower washer 804. In addition, a mistake-proof lip 818 may be attached to the outer side of the upper washer 802 as shown in FIG. 13.

As to the lower washer 804, it may include a cammed surface 820 and a generally smooth bottom face 822. The cammed surface 820 may face and contact the matching cammed surface 808, and share the same surface geometry therewith. For example, the cammed surface 820 may comprise a plurality of cammed elements 824, each of which may have a sloping surface 826 and an abutment surface 828. The slope of the sloping surface 826 may incline in the same direction in reference to the tightening rotation of the corresponding bolt and with a predetermined angle while the slope of the abutment surface 828 may incline in the opposite direction of the tightening rotation with a steep slope. Further, the cammed elements 816 and 824 may be identically spaced and inclined to facilitate an effective engagement between the upper washer 802 and the lower washer 804. Finally, an anti-rotation tab 830 may be attached to the outer side of the lower washer 804 as shown in FIG. 13 with a predetermined shape and dimension. There may be a matching hole (not shown) on the flange surface to which the no flange damage wedge lock washers 800 are placed. This matching hole may receive the anti-rotation tab 830.

Furthermore, one end of the mistake-proof lip 818 pointing away from the washer 802 may have a larger cross-section than the size of the matching hole on the flange surface in such a way that the lip 818 will not move into the matching hole. Accordingly, if the washer 802 is mistakenly used as the lower washer, it will not fit properly on the surface of the flange due to the mismatch between the mistake-proof lip 818 and the matching hole. In addition, if the upper washer 802 is mistakenly placed upside down with its cammed surface 808 pointing toward the bolt head, the mistake-proof lip 818 will act as a protrusion to prevent the bolt from installing properly so that the user will realize that the orientation of the upper washer 802 is wrong. As can be recognized by a skilled artisan, the generally smooth bottom face 822 is always placed first on the flange. Combining all these features together, wrong or incomplete (re)assembly difficulties are eliminated when the wedge lock washers 800 is used. Consequently, the present disclosure provides an alternative solution to provide mistake-proof, easy to re-assemble wedge locking fasteners without causing flange damage.

Even though FIG. 13 depicts no flange damage wedge lock washers 800 as having certain relative dimensions, such dimensions are only exemplary and other relative dimensions are possible. Further, although the mistake-proof lip 818 and the anti-rotation tab 830 are shown in FIG. 13 as having certain shapes, other shapes are possible. Moreover, even though there is one anti-rotation tab 830 in FIG. 13, other numbers of anti-rotation tabs are possible. Finally, as it can be understood by a skilled artisan, anti-rotation features other than the anti-rotation tab 830 may be combined with the mistake-proof lip 818 to provide similar functions of preventing washer alignment mistakes in addition to securing the nut and bolt at the joint when properly aligned.

Figure 14:
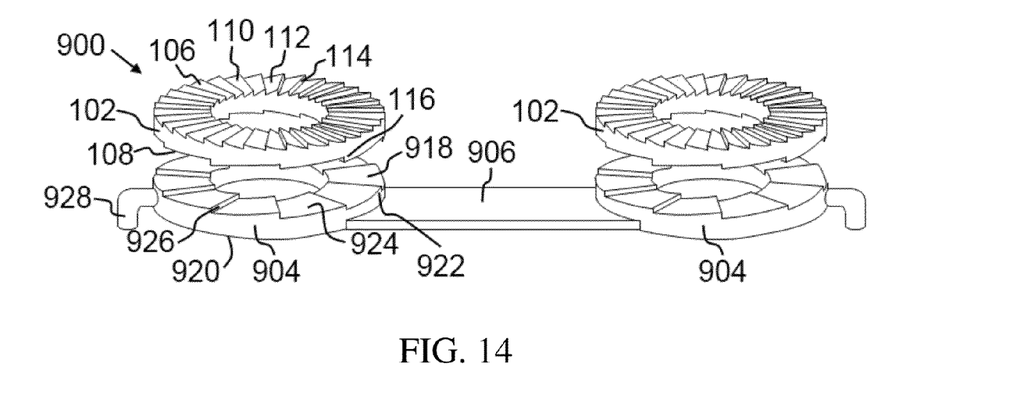
FIG. 14 is an exploded, perspective view of another no flange damage wedge lock washer assembly according to the present disclosure.

Sometimes multiple joints are within close proximity of each other and multiple pairs of wedge lock washers are needed. In these situations, coupling two or more wedge lock washers together may provide certain advantages. Referring to FIG. 14, no flange damage wedge lock washers 900 are shown to include two upper washers 102 with all the components as described in FIG. 6. In addition, the no flange damage wedge lock washers 900 may have two lower washers 904 linked together by a connector 906. Each lower washer 904 may include a cammed surface 918 and a generally smooth bottom face 920. The cammed surface 918 may face and contact the matching cammed surface 108, and share the same surface geometry therewith. For example, the cammed surface 918 may comprise a plurality of cammed elements 922, each of which may have a sloping surface 924 and an abutment surface 926. The slope of the sloping surface 924 may incline in the same direction in reference to the tightening rotation of the corresponding bolt and with a predetermined angle while the slope of the abutment surface 926 may incline in the opposite direction of the tightening rotation with a steep slope. Further, the cammed elements 116 and 922 may be identically spaced and inclined to facilitate an effective engagement between the upper washer 102 and the lower washer 904. Finally, an anti-rotation tab 928 may be attached to the outer side of the lower washer 904 as shown in FIG. 14 with a predetermined shape and dimension. The length of the connector 906 may be determined from the distance between the two joints for the wedge lock washers to secure. There may be two matching holes (not shown) on the flange surface to which the no flange damage wedge lock washers 900 are placed. These matching holes may receive the anti-rotation tabs 928.

Such a configuration may resist higher torques experience by the wedge lock washers during installation or removal since they provide a more balanced and stronger resistance when compared with two wedge lock washers 100 used individually.

Even though FIG. 14 depicts no flange damage wedge lock washers 900 as having certain relative dimensions, such dimensions are only exemplary and other relative dimensions are possible. Further, although the anti-rotation tabs 928 are shown in FIG. 14 as having a certain shape, other shapes are possible. In particular, even though the connector 906 is shown to have certain shape and dimensions, other shapes and dimensions are possible. Moreover, even though there are two anti-rotation tabs 928 in FIG. 11, other numbers of anti-rotation ribs are possible. Even though FIG. 14 shows two pairs of wedge lock washers forge a group, the number of pairs combined together may be 3 and above. Finally, as it can be understood by a skilled artisan, anti-rotation features other than the anti-rotation tab 928 may be combined with the connector 906 to provide similar functions of to securing the nuts and bolts at the joint. Moreover, it is to be understood that the anti-rotation tabs are optional. The washers are unable to rotate relative to the flange due to the web of material correcting the two washers.

Figure 15:
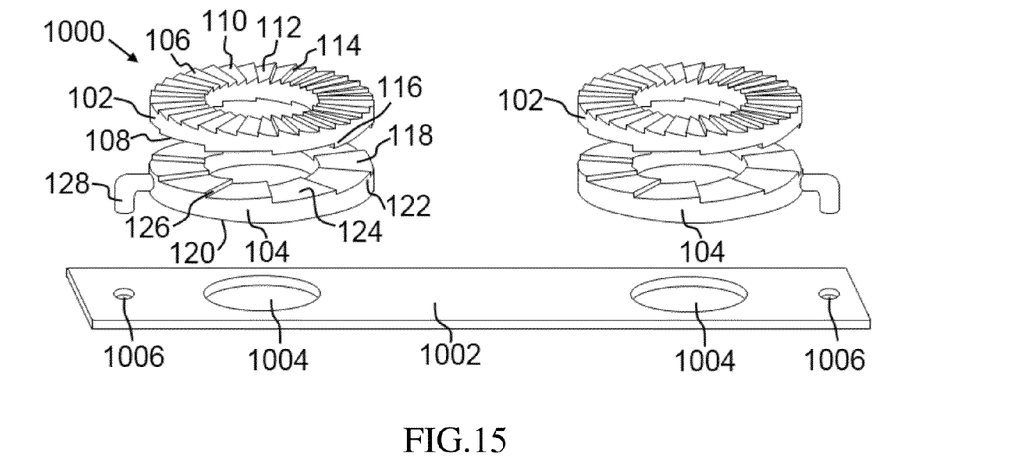
FIG. 15 is an exploded, perspective view of still another no flange damage wedge lock washer assembly according to the present disclosure.

Another application of the present disclosure to the multiple joints situation is depicted in FIG. 15. No flange damage wedge lock washers 1000 are shown to include two matching pairs of the upper washer 102 and the lower washer 104 with all their components as described in FIG. 6. In addition, the no flange damage wedge lock washers 1000 may have a thin, rectangular, ganged protection plate 1002 which includes two bolt apertures 1004 and two anti-rotation apertures 1006. While the bolt aperture 1004 may allow a bolt (not shown) to pass through and reach the joint, the anti-rotation aperture 1006 may allow the anti-rotation tab 128 to pass through and reach the joint. As shown in FIG. 15, the protection plate is placed between the lower washers 104 and the flange. There may be two matching holes (not shown) on the flange surface to which the no flange damage wedge lock washers 1000 are placed. These matching holes may engage with the anti-rotation tabs 128 respectively.

Such a configuration may resist higher torques experience by the wedge lock washers 1000 during installation or removal since they provide a more balanced and stronger resistance when compared with using a pair of wedge lock washers 100 individually without the protection plate 1002. Moreover, the protective plate may enable the use of traditional wedge lock washers without damaging the flange (because the serrations would not be touching the flange—they would be touching the protective plate.) This works because the protective plate is unable to rotate relative to the flange (due to having more than one bolt there through).

Even though FIG. 15 depicts no flange damage wedge lock washers 1000 as having certain relative dimensions, such dimensions are only exemplary and other relative dimensions are possible. Further, although the anti-rotation tabs 128 are shown in FIG. 15 as having a certain shape, other shapes are possible. Moreover, even though there is only one anti-rotation tab 128 for each lower washer 104 in FIG. 15, other numbers of anti-rotation tab 128 are possible. Even though FIG. 15 shows two pairs of wedge lock washers forge a group, the number of pairs combined together may be 3 and above. Finally, as it can be understood by a skilled artisan, anti-rotation features other than the anti-rotation tab 128 may be combined with the protection plate 1002 to provide similar functions to secure the nuts and bolts at the joints.

Industrial Applicability

From the foregoing, it can be seen that the present disclosure describes no flange damage wedge lock washers and fastener assemblies using thereof. Such wedge lock washers and fastener assemblies may find industrial applicability in many applications including, but not limited to, aerospace applications such as gas turbine engines.

Conventional gas turbines might have hundreds or more of joints requiring radial bolts, some of which might have to be a wedge locking fastener without causing flange damage after tightening. By combining the strengths of friction resistance and rotation resistance to rotation without leaving impressions on the flange surface, the present disclosure provides a novel solution to make a better performing and longer failure life wedge locking fastener. In addition, the present disclosure provides novel alternatives to mistake-proof wedge locking fastener assemblies which may be easily reassembled after dissembling. With the present novel design, a wedge locking fastener assembly is produced to have a secured locking mechanism and better control of stress levels on the flange, both of which contribute to higher engine performance. Moreover, using the novel wedge locking fastener assemblies according to the present disclosure to build gas turbine engines opens up new possibilities for gas turbine engine which have heretofore been limited by the conventional fastener assemblies, and which may reduce repair costs and costs associated with turbine failures caused by defected fastener assemblies.

While the invention has been described with reference to certain embodiments, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A locking fastener assembly to secure a joint, the locking fastener assembly comprising:
   a first upper washer and a first lower washer constituting a first pair of washers, the first upper washer having a first serrated side and a first cammed side, the first lower washer having a second cammed side and a first generally smooth side, the first and second cammed sides being arranged to face each other, the first generally smooth side of the first lower washer being arranged to face a flange;
   at least one first means for securement which is on the first lower washer, the at least one first means for securement being arranged to keep together the first lower washer and the flange, a surface of the flange having a receiving member to receive and engage the at least one first means for securement, wherein the surface of the flange faces the first lower washer; and
   at least one protrusion on the first upper washer, wherein when the first upper washer is against the surface of the flange, the at least one protrusion prevents the receiving member from receiving and engaging the first upper washer.

2. The locking fastener assembly of claim 1, further comprising a fastener nut.

3. The locking fastener assembly of claim 1, further comprising a fastener bolt.

4. The locking fastener assembly of claim 1, wherein the at least one first means for securement comprises at least one member selected from the group consisting of a first anti-rotation protrusion on a first outer side of the first lower washer, a second anti-rotation protrusion on the first generally smooth side of the first lower washer, a first generally flat surface on a second outer side of the first lower washer, and an anti-rotation adhesive patch on the first generally smooth side.

5. The locking fastener assembly of claim 1, further comprising:
   a connector connecting the first lower washer with a second lower washer, the second lower washer having a third cammed side and a second generally smooth side, the second generally smooth side of the second lower washer being arranged to face the flange; and
   at least one second means for securement which is on the second lower washer, the at least one second means for securement being arranged to keep together the second lower washer and the flange, the surface of the flange being arranged to receive and engage the at least one second means for securement.

6. The locking fastener assembly of claim 5, further comprising:
   a second upper washer which constitutes a second pair of washers with the second lower washer, the second upper washer having a second serrated side and a fourth cammed side, the third and fourth cammed sides being arranged to face each other.

7. The locking fastener assembly of claim 1, further comprising:
   a bolt, the bolt having a bolt head, wherein when the first cammed side faces the bolt head and the first serrated side faces the second cammed side, the at least one protrusion prevents the bolt from securing the joint.

8. A locking fastener assembly to secure a joint, the locking fastener assembly comprising:
   a first upper washer and a first lower washer constituting a first pair of washers, the first upper washer having a first serrated side and a first cammed side, the first lower washer having a second cammed side and a first generally smooth side, the first and second cammed sides being arranged to face each other, the first generally smooth side of the first lower washer being arranged to face a flange;
   at least one first means for securement which is on the first lower washer, the at least one first means for securement being arranged to keep together the first lower washer and the flange, a surface of the flange having a receiving member to receive and engage the at least one first means for securement, wherein the surface of the flange faces the first lower washer;
   a second lower washer having a third cammed side and a second generally smooth side, the second generally smooth side of the second lower washer being arranged to face the flange;
   at least one second means for securement which is on the second lower washer, the at least one second means for securement being arranged to keep together the second lower washer and the flange, the surface of the flange being arranged to receive and engage the at least one second means for securement; and
   a protection plate, the protection plate being arranged against the surface of the flange, the protection plate comprising at least first and second bolt apertures and at least first and second anti-rotation apertures, the first anti-rotation aperture being arranged to allow the at least one first means for securement to pass through, the second anti-rotation aperture being arranged to allow the at least one second means for securement to pass through, wherein the first and second lower washers are on a first side of the protection plate, and wherein the surface of the flange is on a second side of the protection plate, the first and second sides of the protection plate are opposite to each other.

9. The locking fastener assembly of claim 8, further comprising:
   a second upper washer which constitutes a second pair of washers with the second lower washer, the second upper washer having a second serrated side and a fourth cammed side, the third and fourth cammed sides being arranged to face each other.

10. A wedge lock washer assembly adapted for disposition between a generally flat flange and an opposing generally flat surface on a threaded fastener element, the lock washer assembly comprising:
    a first upper washer and a first lower washer constituting a first pair of washers, the first upper washer having a first serrated side and a first cammed side, the first lower washer having a second cammed side and a first generally smooth side, the first and second cammed sides being arranged to face each other, the first generally smooth side of the first lower washer being arranged to face the generally flat flange;
    at least one first means for securement which is on the first lower washer, the at least one first means for securement being arranged to keep together the first lower washer and the flange, a surface of the flange having a receiving member to receive and engage the at least one first means for securement, wherein the surface of the flange faces the first lower washer; and
    at least one protrusion on the first upper washer, wherein when the first upper washer is against the surface of the flange, the at least one protrusion prevents the receiving member from receiving and engaging the first upper washer.

11. The wedge lock washer assembly of claim 10, wherein the at least one first means for securement comprises at least one member selected from the group consisting of a first anti-rotation protrusion on a first outer side of the first lower washer, a second anti-rotation protrusion on the first generally smooth side of the first lower washer, a first generally flat surface on a second outer side of the first lower washer, and an anti-rotation adhesive patch on the first generally smooth side.

12. The wedge lock washer assembly of claim 10, further comprising:
    a connector connecting the first lower washer with a second lower washer, the second lower washer having a third cammed side and a second generally smooth side, the second generally smooth side of the second lower washer being arranged to face the flange; and
    at least one second means for securement on the second lower washer being arranged to keep together the second lower washer and the flange, the surface of the flange being arranged to receive and engage the at least one second means for securement.

13. The wedge lock washer assembly of claim 12, further comprising:
    a second upper washer which constitutes a second pair of washers with the second lower washer, the second upper washer having a second serrated side and a fourth cammed side, the third and fourth cammed sides being arranged to face each other.

14. A wedge lock washer assembly adapted for disposition between a generally flat flange and an opposing generally flat surface on a threaded fastener element, the lock washer assembly comprising:
- a first upper washer and a first lower washer constituting a first pair of washers, the first upper washer having a first serrated side and a first cammed side, the first lower washer having a second cammed side and a first generally smooth side, the first and second cammed sides being arranged to face each other, the first generally smooth side of the first lower washer being arranged to face the generally flat flange;
- at least one first means for securement which is on the first lower washer, the at least one first means for securement being arranged to keep together the first lower washer and the flange, a surface of the flange having a receiving member to receive and engage the at least one first means for securement, wherein the surface of the flange faces the first lower washer;
- a second lower washer having a third cammed side and a second generally smooth side, the second generally smooth side of the second lower washer being arranged to face the flange;
- at least one second means for securement on the second lower washer being arranged to keep together the second lower washer and the flange, the surface of the flange being arranged to receive and engage the at least one second means for securement; and
- a protection plate, the protection plate being arranged against the surface of the flange, the protection plate comprising at least first and second bolt apertures and at least first and second anti-rotation apertures, the first anti-rotation aperture being arranged to allow the at least one first means for securement to pass through, the second anti-rotation aperture being arranged to allow the at least one second means for securement to pass through, wherein the first and second lower washers are on a first side of the protection plate, and wherein the surface of the flange is on a second side of the protection plate, the first and second sides of the protection plate are opposite to each other.

15. The wedge lock washer assembly of claim 14, further comprising:
- a second upper washer which constitutes a second pair of washers with the second lower washer, the second upper washer having a second serrated side and a fourth cammed side, the third and fourth cammed sides being arranged to face each other.

* * * * *